United States Patent [19]
Fewel, Jr.

[11] Patent Number: 5,104,431
[45] Date of Patent: Apr. 14, 1992

[54] HIGH CAPACITY VANE

[75] Inventor: Kenneth J. Fewel, Jr., Dallas, Tex.

[73] Assignee: Peerless Manufacturing Company, Dallas, Tex.

[21] Appl. No.: 540,800

[22] Filed: Jun. 20, 1990

[51] Int. Cl.$^5$ .................................. B01D 45/08
[52] U.S. Cl. ........................... 55/440; 55/443; 55/446
[58] Field of Search .............. 55/257.2, 440, 442–446, 55/462–465

[56] References Cited

U.S. PATENT DOCUMENTS

| | | | |
|---|---|---|---|
| D. 263,738 | 4/1982 | Sixsmith | D23/163 |
| 877,460 | 1/1908 | Brunner et al. | 55/464 X |
| 947,393 | 1/1910 | Muchka | 55/440 |
| 1,519,428 | 12/1924 | Wilisch | 55/443 X |
| 1,956,591 | 5/1934 | Gies | 55/440 X |
| 2,643,736 | 6/1953 | Smith | 55/440 |
| 3,338,035 | 3/1965 | Dinkelacker | 55/440 |
| 3,358,580 | 12/1967 | Freese et al. | 55/440 X |
| 3,405,511 | 10/1968 | Halter et al. | 55/440 |
| 3,527,030 | 9/1970 | Hungate | 55/440 |
| 3,713,278 | 1/1973 | Miller et al. | 55/440 X |
| 3,748,832 | 7/1973 | Furlong et al. | 55/440 X |
| 3,849,095 | 11/1974 | Regehr | 55/440 X |
| 3,870,488 | 3/1975 | Arndt et al. | 55/440 |
| 3,899,427 | 8/1975 | Connelly et al. | 55/440 X |
| 3,912,471 | 10/1975 | Cotton, Jr. | 55/440 |
| 3,938,972 | 2/1976 | Sugimura | 55/440 |
| 3,950,156 | 4/1976 | Kall | 55/443 X |
| 3,953,183 | 4/1976 | Regehr | 55/440 |
| 3,977,977 | 8/1976 | Kall | 55/440 X |
| 4,014,669 | 3/1977 | Thompson et al. | 55/440 X |
| 4,053,292 | 10/1977 | Schneider et al. | 55/440 X |
| 4,141,706 | 2/1979 | Regehr | 55/440 X |
| 4,175,938 | 11/1979 | Regehr et al. | 55/442 X |
| 4,198,215 | 4/1980 | Regehr | 55/440 X |
| 4,198,219 | 4/1980 | Krisko | 55/440 |
| 4,204,847 | 5/1980 | Ko | 55/440 X |
| 4,225,188 | 9/1980 | McGuire et al. | 55/440 X |
| 4,251,242 | 2/1981 | Ito | 55/440 X |
| 4,430,101 | 2/1984 | Sixsmith | 55/440 |
| 4,530,707 | 7/1985 | Ovard | 55/257.2 X |
| 4,543,108 | 9/1985 | Warz | 55/44Q X |
| 4,557,740 | 12/1985 | Smith | 55/440 |
| 4,581,051 | 4/1986 | Regehr et al. | 55/440 |
| 4,738,698 | 4/1988 | Holcblat | 55/440 |
| 4,802,901 | 2/1989 | Wurz et al. | 55/440 |

FOREIGN PATENT DOCUMENTS

| | | | |
|---|---|---|---|
| 828547 | 12/1969 | Canada | 55/440 |
| 0330704 | 9/1989 | European Pat. Off. | 55/440 |
| 257368 | 3/1913 | Fed. Rep. of Germany | 55/440 |
| 2628628 | 12/1977 | Fed. Rep. of Germany | 55/440 |
| 1150603 | 1/1958 | France | 55/440 |
| 2384103 | 11/1978 | France | 55/440 |
| 1111797 | 9/1984 | U.S.S.R. | 55/440 |
| 1465044 | 2/1977 | United Kingdom | 55/440 |
| 2199260 | 7/1988 | United Kingdom | 55/440 |

Primary Examiner—Robert Spitzer
Attorney, Agent, or Firm—Richards, Medlock & Andrews

[57] ABSTRACT

A high capacity vane (10) is disclosed which incorporates a series of members (16, 18) extending at predetermined angles relative to the direction of flow of a liquid bearing gas. Each of the members includes an upstream cavity (20) and a downstream (21) which communicate with the flow through longitudinal slots (24, 28). The flow interaction with the slots and cavities provide sufficient separation of the liquid from the gas flow.

4 Claims, 6 Drawing Sheets

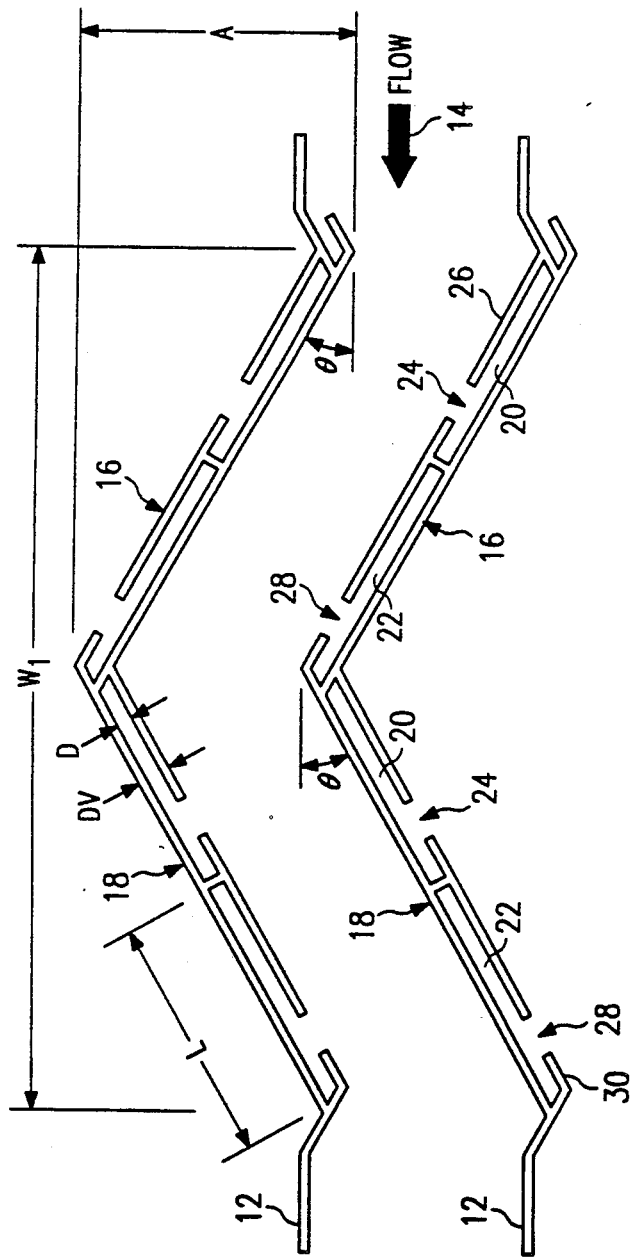
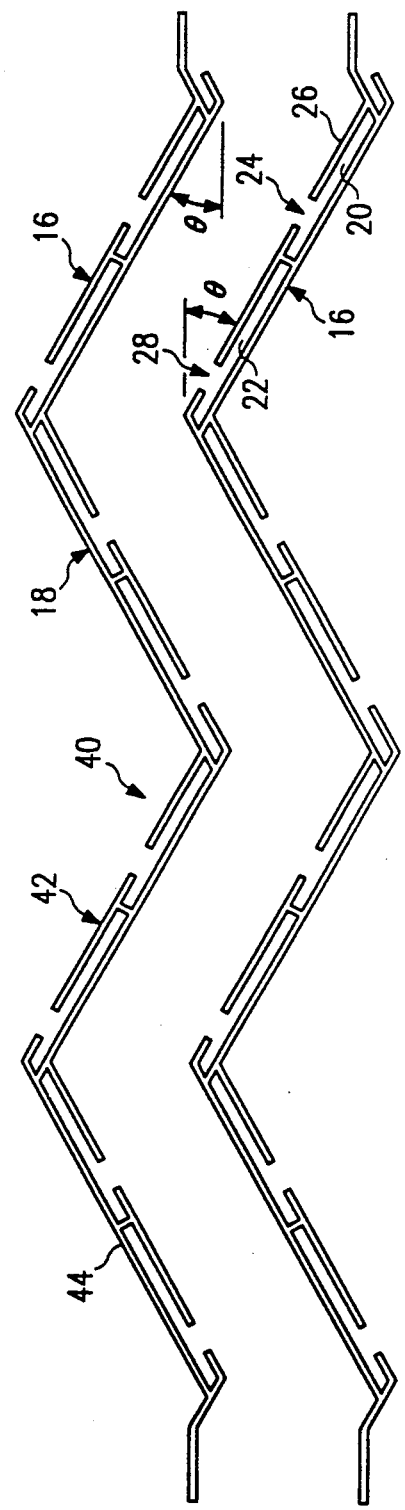
FIG. 2
FIG. 3

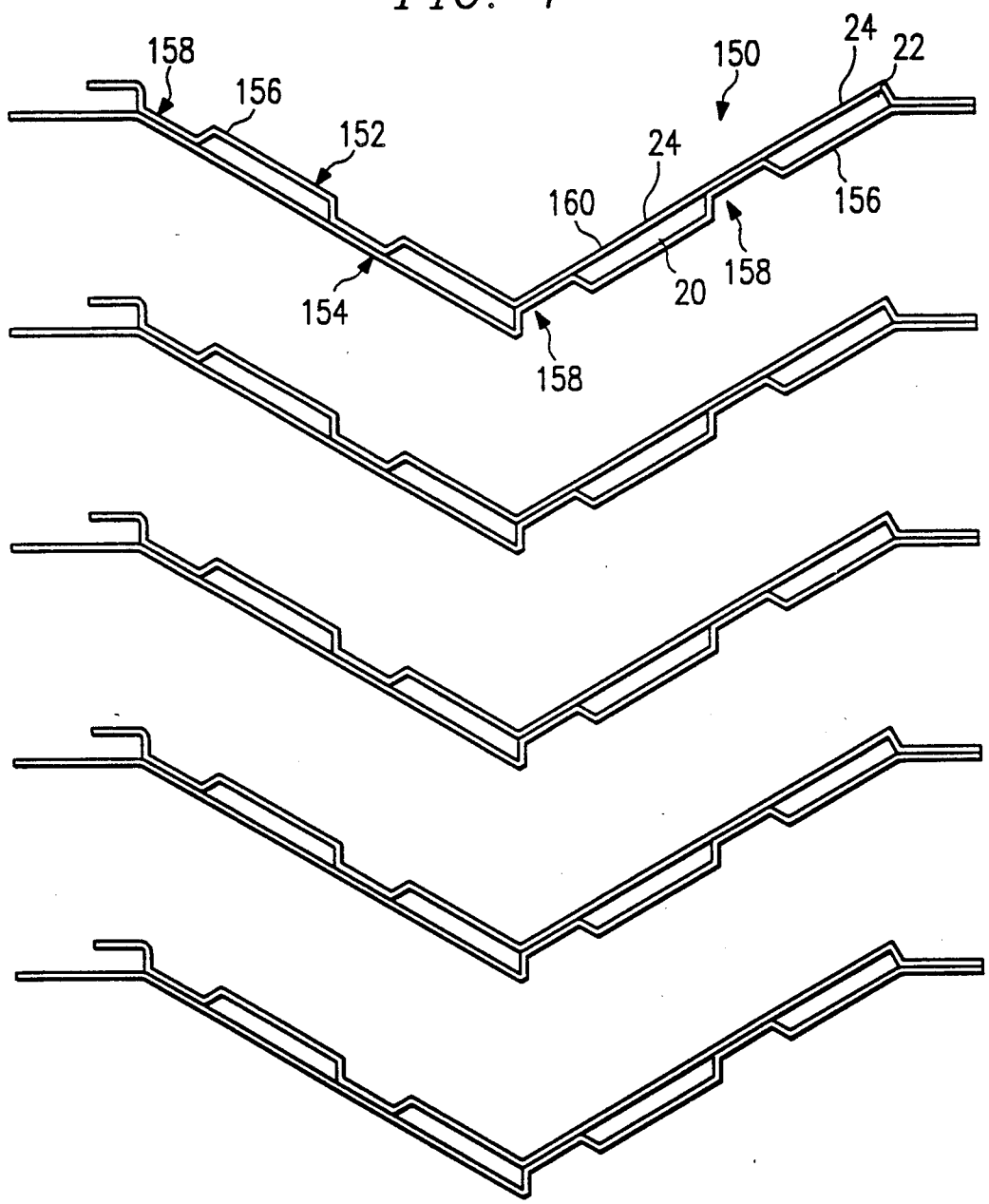

PRESSURE DROP COMPARISON

LIQUID CAPACITY COMPARISON

HIGH CAPACITY VANE

TECHNICAL FIELD

This invention relates to a vane, particularly a vane for liquid-gas separation, such as condensate from vapors, seawater from air, and absorptive liquids from treated gases.

BACKGROUND OF THE INVENTION

Virtually all internal combustion engines require the use of an air filtering mechanism to maintain the inlet air flowing into the engine as free of contaminants and as clean as possible to maximize the service life of the engine. This requirement is particularly important when the engines are mounted on shipboard and the available air is salt and moisture laden. In such an environment, one of the primary requirements of such separators is to separate the moisture from the air. This is particularly important when the marine engines are gas turbines, where moisture droplets impinging on the blades of the turbines can do severe damage.

As can readily be understood, space aboard a ship for such separators is often at a premium, however, the separators must perform their function adequately in order to prevent damage to the engine. Therefore, there is an ongoing need to increase the efficiency and the compactness of these separators.

SUMMARY OF THE INVENTION

In accordance with one aspect of the present invention, a high capacity vane is provided which includes a vane having a first member extending at a predetermined angle relative to the direction of air flow from a leading edge to a trailing edge. A second member extends from the trailing edge of the first member at a second predetermined angle relative to the direction of air flow. Each of said first and second members have first and second interior cavities formed therein. On a first side of the first member are formed first and second longitudinal openings, each extending perpendicular the direction of air flow with each of the openings opening into one of the cavities in the first member. On a second side of the second member, the second side being opposite the first side, are formed first and second longitudinal openings each extending perpendicular the direction of air flow which open into each of the cavities in the second member.

BRIEF DESCRIPTION OF THE DRAWINGS

For a more complete understanding of the present invention and the advantages thereof, reference is now made to the following description taken in conjunction with the accompanying drawings, in which:

FIG. 2 is a horizontal cross sectional view of a vane forming a first embodiment of the present invention;

FIG. 3 is a horizontal cross sectional view of a vane forming a second embodiment of the present invention;

FIG. 7 is a horizontal cross sectional view of a steel vane forming a third embodiment of the present invention;

DETAILED DESCRIPTION

Figure 1C:
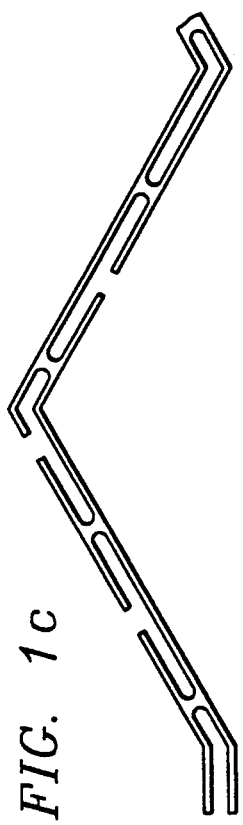
FIGS. 1(A-C) is a perspective view of a separator assembled of vanes forming a first embodiment of the present invention.
Figure 1B:
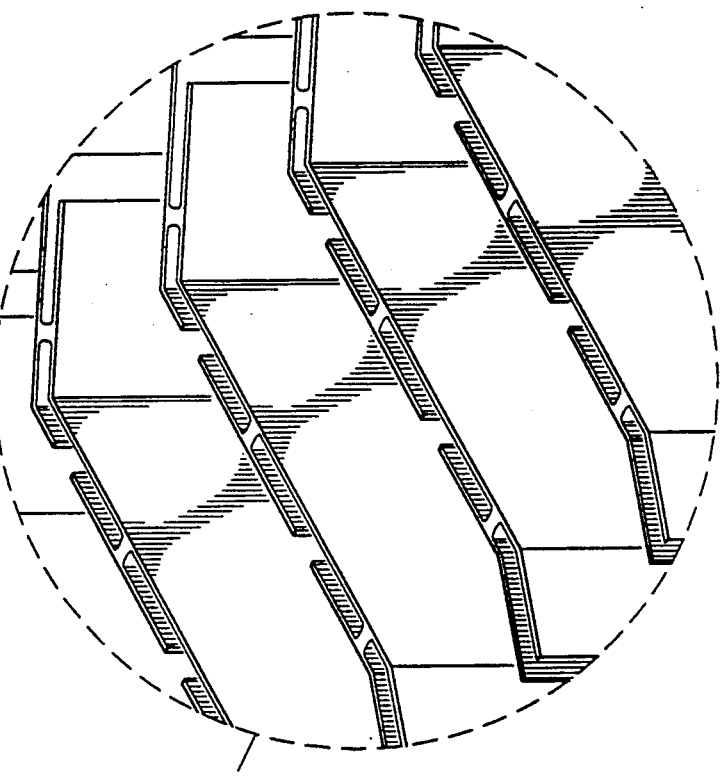
Figure 1A:
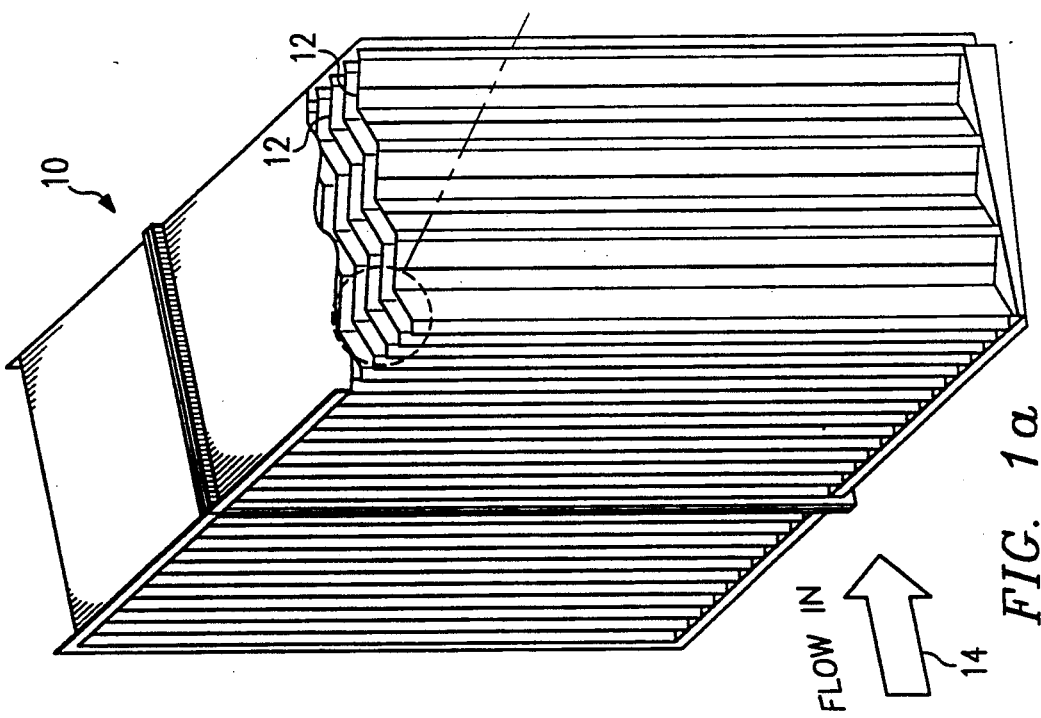

With reference now to the drawings, wherein like reference characters designate like or similar parts throughout the several views, FIG. 1 illustrates broadly a separator 10 formed of an assembly of vanes 12 for the separation of moisture from an air flow passing through the separator 10 in the direction of arrow 14.

As will be understood, the vanes 12 are extremely high performance vanes relative to that previously in existence, which permits the separator 10 to be made more compact for a given performance requirement.

With reference to FIG. 2, the construction of vanes 12 will be described. Preferably, vanes 12 are formed of an aluminum extrusion which define a series of boxlike members 16 and 18 which extend generally along the direction of air flow but at a predetermined angle relative thereto. Each of the members is hollow and defines an upstream cavity 20 and a downstream cavity 22 which extends the entire height of the vanes. A longitudinal upstream opening or slot 24 extends through a first side 26 of member 16 into the upstream cavity 20. A similar slot 28 opens into the downstream cavity 22.

A second side 30 of member 18, on a side opposite that of the first side 26, includes similar slots 24 and 28 opening into cavities 20 and 22 respectively.

As can be seen in FIG. 2, as air laden with moisture flows in the direction of arrow 14, some of the air will enter the cavities 20 and 22 of member 16, where the convoluted and multi-directional airflow which results separates out the denser moisture and drains the separated moisture along the cavities to the bottom of the separator. Similarly, air flow passing the first member will impinge upon the similar slots in the member 18 of the adjacent vane, which will further agitate the air flow for moisture separation.

It will be understood that the vane of the present invention can be utilized for all forms of liquid and gas separation. Separation of moisture from air is simply one example of this use. For example, the vanes can also be used to remove condensate from vapors and absorptive liquid from treated gases.

It can be seen that each cavity 20 and 22 has a transverse thickness or depth D which generally is perpendicular to the direction of air flow. Preferably, this dimension D is less than 1/45 of the vane wavelength W and less than 1/14 of the peak-to-peak amplitude A of the vane while still providing drainage space amounting to greater than 50 percent of the vane cross sectional area. However, the dimension D should not be too small so as to create surface tension concerns for draining separated fluids along the cavities.

The drainage space referred to is effectively the volume of each cavity 20 and 22, divided by the height H.

Figure 6:
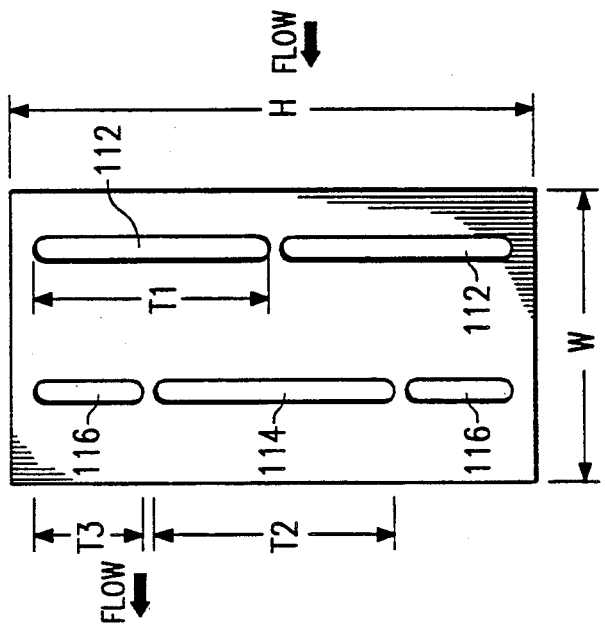
FIG. 6 is a side view of one of the components of the vane of FIG. 4 illustrating the formation of the slots.

This volume is defined by the length L of each cavity, which generally lies parallel the direction of air flow, the depth D and the height H of the vane [see FIG. 6]. The vane cross sectional area would be the width W of the vane times the thickness DV of the vane.

These relationships allow an increase in the speed of the air flow through the vanes without re-entrainment of separated fluids, thus increasing the capacity of the vanes 12 over prior known designs. For example, vanes constructed in accordance with the designs of the present invention are capable of air flows of 65 ft/sec without significant re-entrainment of separated fluids, while prior designs can only tolerate speeds of 45 ft/sec before significant re-entrainment begins to occur.

With such a construction, vanes 12 will provide for a contraction of the flow necessary to pass through the vane of less than 33 percent, while still maintaining adequate tortuosity to separate droplets as small as ten microns in diameter with 95 percent efficiency With reference now to FIG. 3, a vane 40 forming a second embodiment of the present invention is illustrated. In vane 40 will be used a series of members 16, 18, 42 and 44. The construction of members 42 and 44 is identical to that of members 16 and 18, and vane 40 could be used in environments with very high moisture removal requirements.

Figure 4:
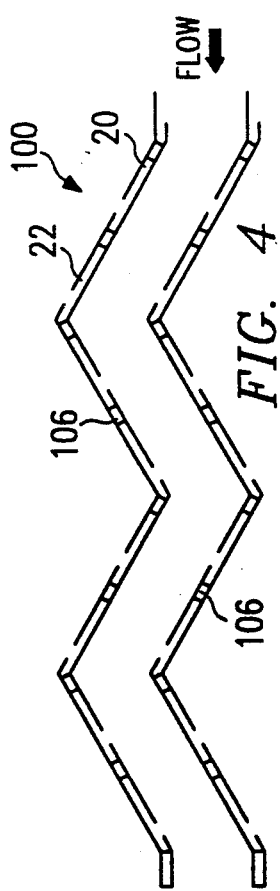
FIG. 4 is a horizontal cross sectional view of a steel vane forming a second embodiment of the present invention.
Figure 5:
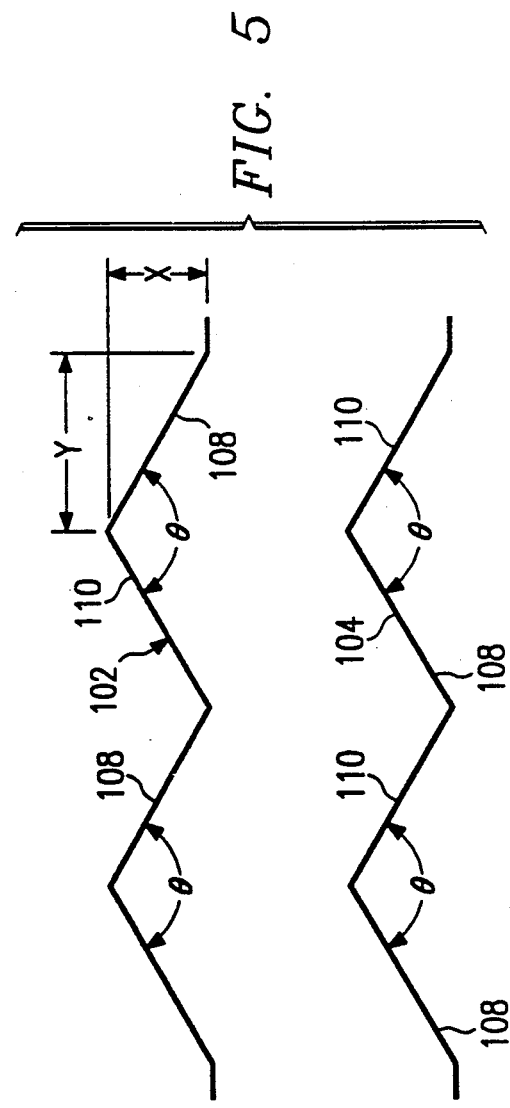
FIG. 5 is a horizontal cross sectional view of the components forming the vane of FIG. 4.
Figure 8:
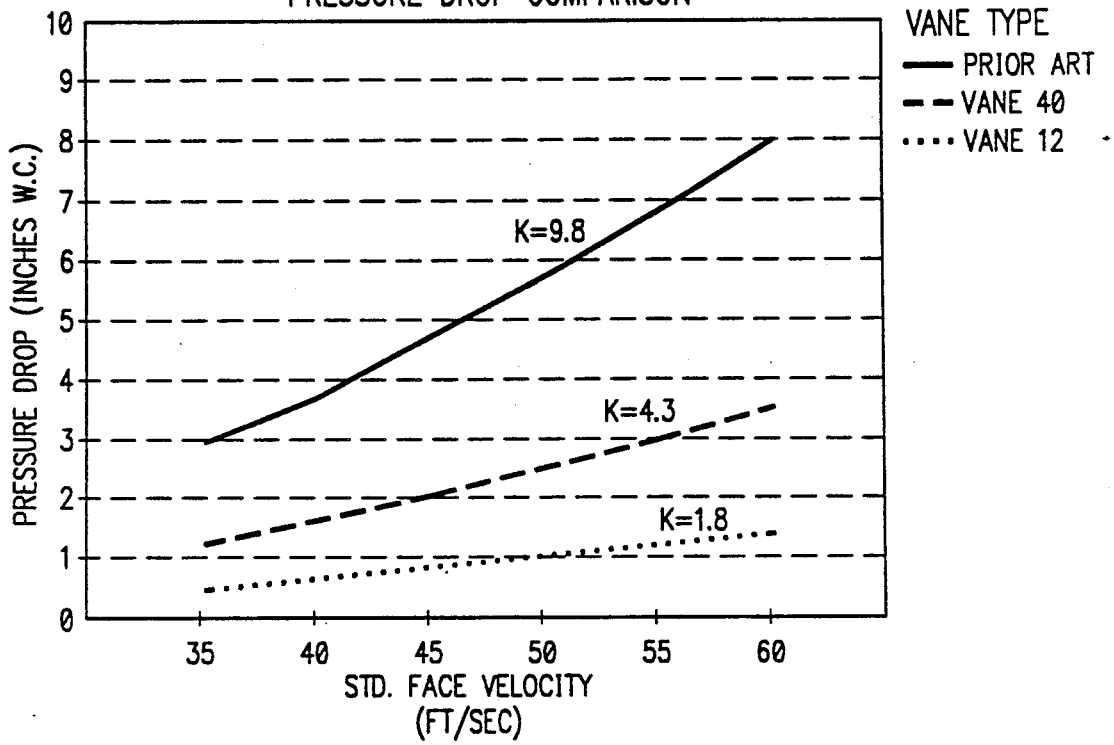
FIG. 8 is a graph showing a performance comparison between a vane of the present invention and prior known vanes.
Figure 9:
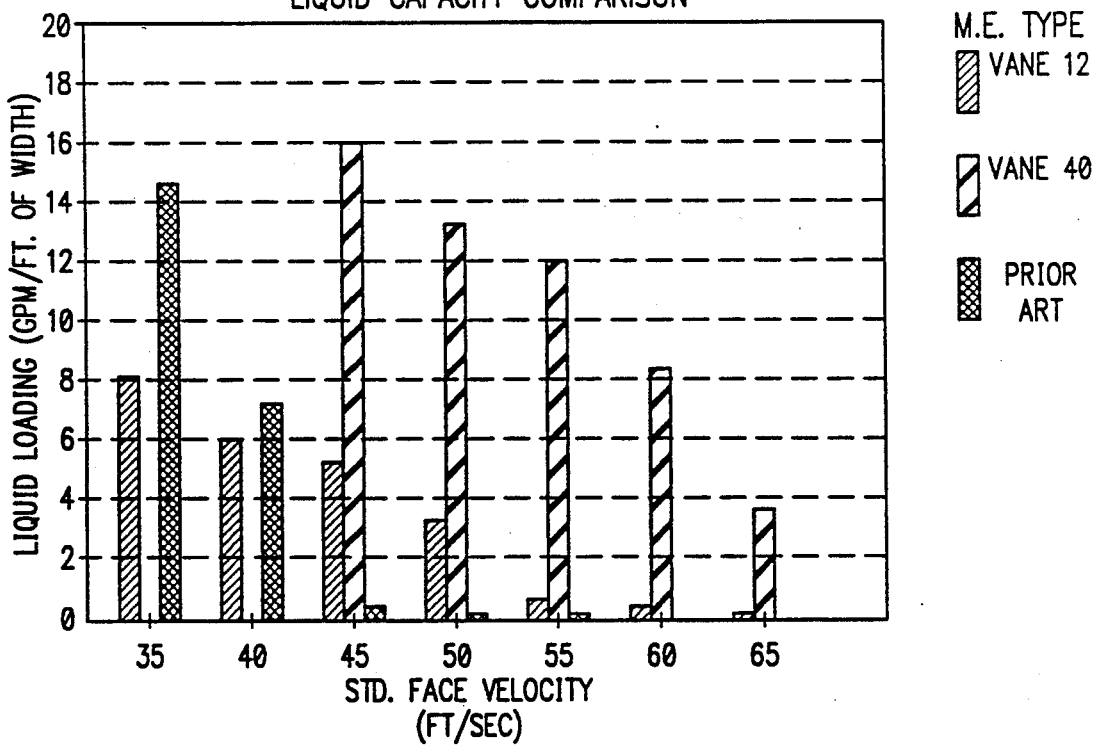
FIG. 9 is a chart which compares liquid capacity between vanes of the present invention and prior known vane design.
Figure 10:
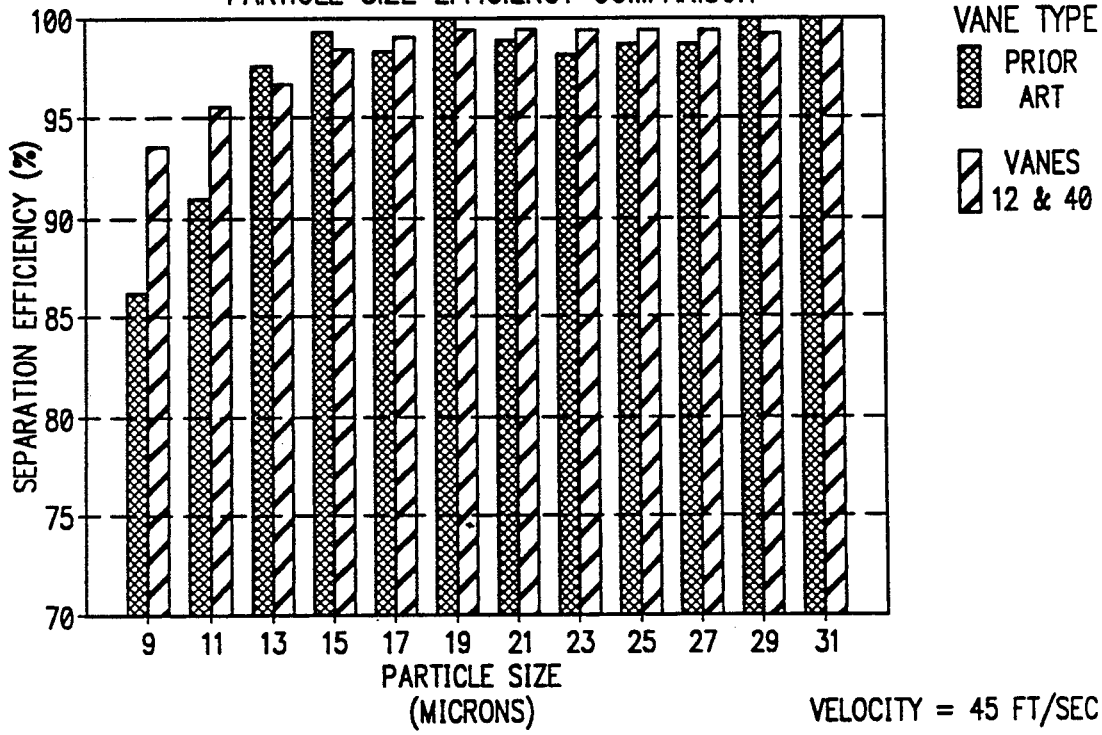
FIGS. 10 and 11 are charts comparing particle size efficiency between vanes of the present invention and a prior known vane for different flow velocities.
Figure 11:
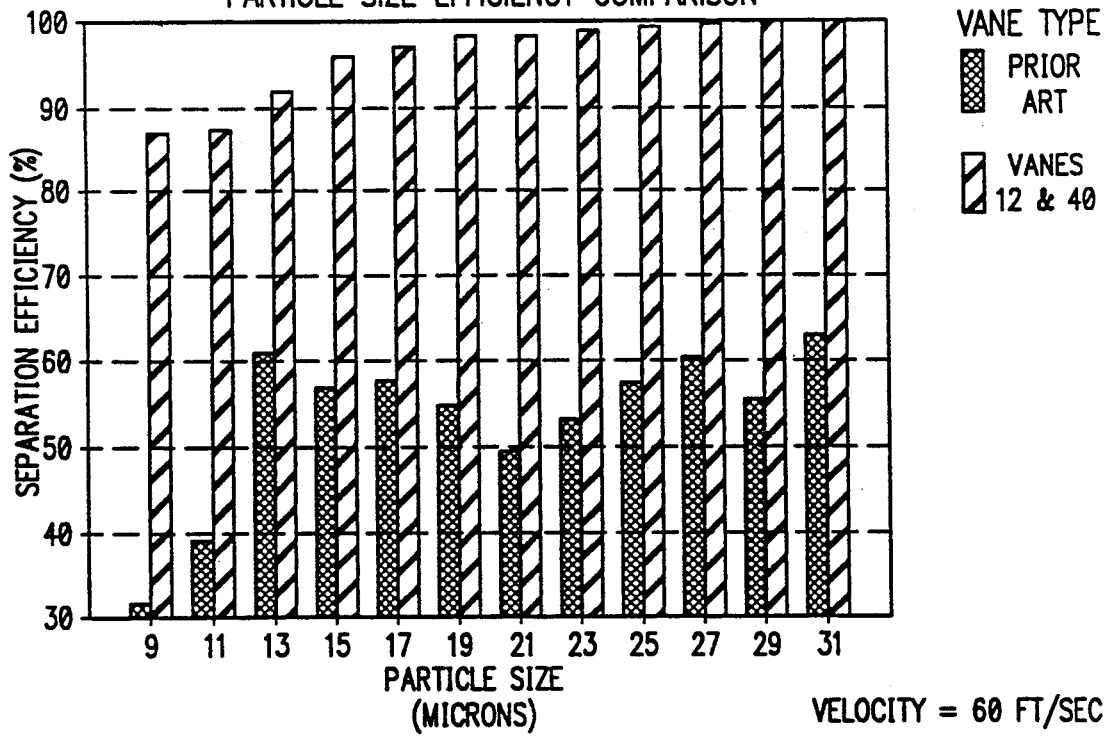

With reference now to FIGS. 4–6, a vane 100 forming a third embodiment of the present invention is illustrated. As best seen in FIG. 5, the vane 100 is formed by joining a first member 102 and a second member 104 to form each vane. Members 102 and 104 are preferably of carbon steel which are welded together at spacers 106 to define upstream cavities 20 and downstream cavities 22. As best seen in FIG. 6 slots 24 are formed in alternating panels 108 of each member with the intervening panel 110 being solid. The slot opening into the upstream cavity 20 is preferably formed of a pair of equal length slots 112. The openings into the downstream cavity 22 are preferably formed of an intermediate slot 114 and shorter equal length outer slots 116.

In one separator constructed of vanes 100 in accordance with the teachings of the present invention, the members 102 and 104 were essentially identical in dimensional characteristics with the angle theta between each panel being 120°. The dimension X of each panel was 1.46 inches while the dimension Y was about 2.48 inches. The height H, of the vane was about 40 inches. The slots 112, 114, and 116 were each approximately ¼ inch wide (dimension WS). The slots 112 were about 19.38 inches tall (dimension T1), the slot 114 was about 14.5 inches tall (dimension T2) and the slots 116 were about 12 inches tall (dimension T3). ½ inch separated the outer slots 112 and 116 from the upper and lower edges of the members while each slot was separated from its adjacent slot by a quarter inch.

With reference now to FIG. 7, a vane 150 forming a fourth embodiment of the present invention is illustrated. Each vane 150 is formed of a first member 152 and a second member 154, with the members' spot welded together. Again, vanes 150 are preferably formed of steel. In the members 152 and 154, alternating panels 156 have u-shaped ridges 158 stamped therein which abut against panels 160 to define the upstream and downstream cavities 20 and 22. Slots 24 are then formed through the panels 160 as illustrated in a manner similar to vanes 100.

Vanes 40, 100 and 150 are all constructed as vane 12 in having the transverse thickness D of the drainage pocket less than 1/45 of the vane wavelength and less than 1/14 of the peak-to-peak amplitude, while still providing drainage space amounting to greater than 50 percent of the vane cross sectional area.

FIGS. 8–11 illustrate the significant enhanced performance characteristics for vanes as disclosed in the present invention as compared to a prior known high performance vane. These figures clearly show the advantage of the present invention.

While several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

I claim:

1. A high capacity vane for a moisture separator to separate moisture from air flowing in an air flow direction, comprising:
    a first member extending at a predetermined angle relative to the direction of air flow from a leading edge to a trailing edge, said first member having an upstream cavity formed therein and a downstream cavity formed therein;
    a second member extending from the trailing edge of the first member at a second predetermined angle relative to the direction of air flow, said second member having an upstream cavity formed therein, and a downstream cavity formed therein; and
    a first side of said first member having first and second longitudinal slots formed therein perpendicular the direction of air flow, each of said slots opening into one of said cavities, a second side of said second member having first and second slots formed therein extending perpendicular the direction of air flow, each of said slots opening into a cavity in said second member.

2. The high capacity vane of claim 1 wherein a plurality of vanes are positioned at predetermined separations along a direction perpendicular the direction of air flow to separate moisture from the air flow.

3. The high capacity vane of claim 1 wherein the flow contracts as it passes through the vanes, the contraction of the flow necessary to pass through the vane being less than 33 percent, while still maintaining tortuosity to separate droplets as small as ten microns in diameter with 95 percent efficiency.

4. The high capacity vane of claim 1 having a vane wavelength and a peak-to-peak amplitude, said upstream and downstream cavities in each of said first and second members each having a transverse thickness, the transverse thickness of the cavities being less than 1/45 of the vane wavelength and less the 1/14 of the peak-to-peak amplitude.

* * * * *